April 6, 1948.        F. H. NICOLL        2,439,181
LUMINESCENT SCREEN
Filed May 17, 1946
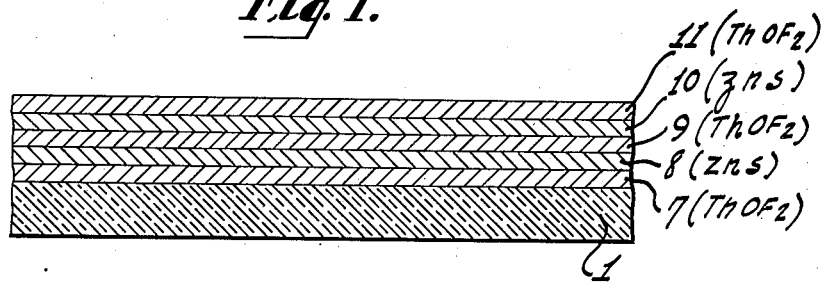
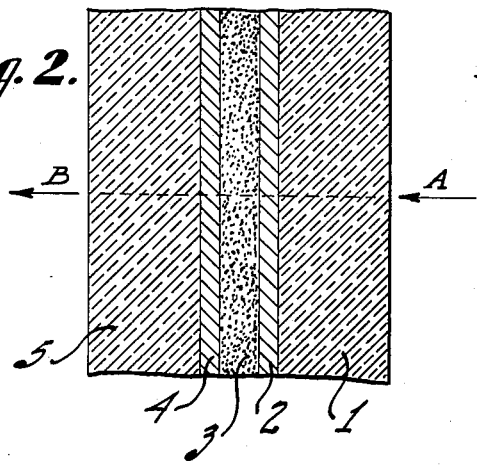
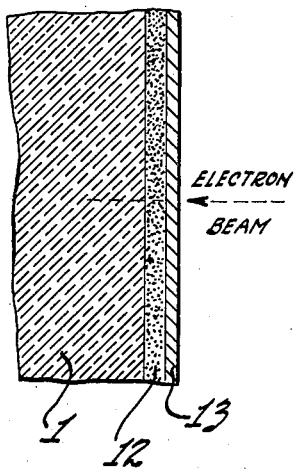
INVENTOR.
Frederick H. Nicoll
BY
ATTORNEY Patented Apr. 6, 1948

2,439,181

UNITED STATES PATENT OFFICE 2,439,181

LUMINESCENT SCREEN

Frederick H. Nicoll, Princeton, N. J., assignor to Radio Corporation of America, a corporation of Delaware Application May 17, 1946, Serial No. 670,427

9 Claims. (Cl. 250—80)

This invention relates to the manufacture of improved phosphor-coated screens. More particularly, it relates to screens intended to be excited by light, or similar energy, of a selected wavelength as against screens designed to be excited by electron bombardment.

A certain class of materials known as phosphors has the unique characteristic of emitting light of a particular wavelength when excited by energy of a shorter wavelength. The exciting energy may be derived from a stream of electrons or from vibrations ranging in wavelength from the ultra-violet through the visible spectrum.

Many uses have been found for screens coated with these phosphors. They have been incorporated into the well known fluorescent lighting fixtures, screens of cathode ray tubes, and viewing screens of television instruments, electron microscopes, and fluoroscopes. In most of these applications, however, a stream of electrons is the agent used to excite the phosphor and even fluorescent lighting fixture tubes use a source of excitation which is non-visible in the form of ultraviolet light. Screens made according to the present invention may be adapted to most of the above uses and many others since, in a practical sense, they serve as light multipliers. Like other luminescent screens, they absorb radiations of the shorter wavelengths and emit light of longer wavelengths but since they concentrate the emitted rays in one desired direction, the result is that they appear to have greatly increased brightness compared to screens made by former methods.

One object of the present invention is to provide an improved luminescent screen having an apparently multiplied light output.

Another object is to provide a luminescent screen utilizing a thinner coating of phosphors.

Another object is to provide a more efficient means of converting energy into visible light.

Another object is to provide a more efficient light filter.

Another object is to provide a means for obtaining an increased output of light of a certain desired wavelength in a desired direction.

Other objects of the invention will be apparent to those skilled in the art from a reading of the following specification and an inspection of the accompanying drawings in which:

Fig. 1 is an enlarged cross section view of one example of a dichroic reflector suitable for use in the invention.

Fig. 2 is an enlarged cross section view of a screen illustrating one embodiment of the invention.

Fig. 3 is an enlarged detail view of part of a screen illustrating a special use of the invention.

The invention may be illustrated in connection with a phosphor which emits yellow light and which may be excited with blue light. Such a phosphor material may be prepared by combining zinc, cadmium and sulfur ions in the desired proportions. One example of a suitable composition contains zinc sulfide, 50 parts by weight, cadmium sulfide, 50 parts by weight and silver, 0.01 part by weight, the latter being an activator.

The preparation of the complete screen is as follows: As shown in Fig. 1, a dichroic reflector is first prepared which reflects yellow light but transmits blue light. This reflector can be prepared by the method described in the patent of Glenn L. Dimmick, No. 2,399,860, which is assigned to the present assignee. In this method, a number of very thin layers of two different materials having widely varying indices of refraction are deposited on a transparent glass surface by the method of vapor coating. In the form illustrated, a glass base 1 has deposited on its surface a number of coatings 7, 8, 9, 10, 11, which are alternately thorium oxyfluoride and zinc sulfide. By regulating the thickness of each layer according to the table shown in Fig. 2 of the above mentioned patent, a filter is obtained which reflects yellow light but transmits blue light. Another filter may be prepared using alternate layers of the same substances but which transmits yellow light and reflects blue light. This filter may have the thicknesses of the various layers corresponding to those shown in the table of Fig. 3 of the above mentioned patent.

These two dichroic filters are placed with their coated surfaces facing each other and between the two coated faces is placed a layer of the phosphor material. The completed screen is shown in Fig. 2 in which 1 and 5 are glass plates and 2 and 4 are the composite coatings of zinc sulfide and thorium oxyfluoride illustrated in Fig. 1. The layer of phosphor 3 is placed between the composite coatings 2 and 4.

The operation of this screen in producing an intensified yellow light is as follows: Blue light is allowed to enter the transparent glass plate at A, the filtering layer 2 being one which transmits blue light, allows the light to pass through unhindered. This light strikes the layer of phosphor 3 and yellow light is given off in all directions. But the yellow light which is given off in the direction toward A is reflected back into the phosphor layer by the filter coating 2 which reflects yellow light. This reflected light plus the light which would be given off in the direction toward B is allowed to pass through the filter layer 4 which transmits yellow light and thence goes out through the glass plate 5 as shown by the arrow B. The layer of phosphor 3 may be made quite thin for the sake of efficiency. Ordinarily, a thin coating of the phosphor would not be sufficient to convert all of the impinging blue light into yellow light. But in this case the blue light which is not converted on its first passage through the phosphor is reflected back by the dichroic filter layer 4 until substantially all of it is converted into yellow light. Thus, a very thin layer of phosphor may be used to convert substantially all of the light of one wavelength into light of another wavelength.

For maximum efficiency, the thickness of the phosphor layer must be optimum. This will vary in different instances but a layer having a weight of 50 mg. per sq. cm. has proven satisfactory.

In an ordinary system, using no dichroic filters, a much thicker layer of phosphor would be used. The thicker screen would also enable a high percentage of conversion of blue into yellow light but the thicker screen causes much greater loss of yellow light by absorption. Using a system as illustrated according to the present invention, approximately four times as much light output can be obtained as from a system using no dichroic filters.

The system is, of course, not limited to use of phosphors which absorb blue light and emit yellow light. Any phosphor can be used emitting any color for which corresponding dichroic reflectors can be made. Dichroic reflectors can be made which transmit a maximum of energy having almost any desired wavelength in the visible and near-visible portions of the spectrum as taught by Dimmick in the previously mentioned patent as well as in Dimmick Patent No. 2,422,954.

The invention is also not limited to use of phosphors which must be excited by visible wavelengths of light but can also be used for increasing the light output from phosphors, which emit stored energy on exposure to infrared light. In this case, the light emitted by the phosphor is usually yellow or red yellow. The reflector on the side exposed to the infrared rays should be transmitting in the infrared but reflecting in the yellow. The other dichroic reflector should be reflecting in the infrared and transmitting in the yellow. Screens used in this manner usually first have the phosphor layer irradiated with light of visible wavelength in order to first store up energy which is later to be released by excitation of the infrared energy.

In most types of practical applications in which a screen constructed according to the present invention may be used, the exciting light or infrared is focused on the surface of the screen by means of a lens system. It may also be used, however, where the exciting light is generated in another phosphor by electron bombardment and thus used to intensify the light output of fluoroscope or television viewing screens. In this embodiment, shown in Fig. 3, a layer of phosphor 12, which is to provide the exciting light is placed on the side of the screen facing A, Fig. 2. In order to intensify the light output caused by the electron beam, a thin coating of aluminum 13 is placed over the coating of phosphor. In this instance, the transparent plate I should be very thin.

Since dichroic reflectors can also be constructed, which either transmit or reflect a large proportion of ultraviolet energy and reflect or transmit a corresponding complementary proportion of impinging light in the yellow portion of the spectrum, the invention can also be used to intensify the light output of some of those phosphors which are best excited by ultraviolet radiations. Thus, the invention allows the use of much thinner coatings of the phosphor and cuts down large light losses due to absorption.

There has thus been described an improved luminescent screen having greatly intensified light output. Regardless of the phosphor used the principle of construction is the same. That is, the dichroic filter intended to be positioned on the side of the screen facing the exciting light, in other words the input side, should transmit the exciting wavelength and reflect the wavelength of energy emitted by the phosphor. The dichroic filter to be positioned on the output side of the screen should transmit the emitted wavelength but reflect the exciting wavelength. In the case of any particular dichroic filter, the wavelength of maximum transmission is, in general, complementary to the wavelength of maximum reflection or minimum transmission but there are exceptions to this rule.

I claim as my invention:

1. A luminescent screen comprising two dichroic reflectors, one of which transmits a maximum amount of energy of a first wavelength and reflecting a maximum amount of energy of a second wavelength, the second dichroic reflector reflecting a maximum amount of energy of said first wavelength and transmitting a maximum amount of energy of said second wavelength and between said dichroic reflectors a layer of a phosphor which emits light of one of said wavelengths and can be excited by energy of the other of said wavelengths.

2. A luminescent screen comprising in successive order a dichroic reflector which transmits light of a first wavelength but reflects light of a second wavelength, a phosphor which, when excited by light of said first wavelength, emits light predominantly of said second wavelength and a second dichroic reflector which reflects light of said first wavelength and transmits light of said second wavelength.

3. A luminescent screen comprising a layer of material which absorbs energy of one wavelength and emits visible light energy of another wavelength, said material having on either side two dichroic reflectors, one of which reflects light and the other of which transmits light of said emitted wavelength.

4. An apparatus comprising an exciting source of energy of a first wavelength, facing said exciting source a dichroic reflector which transmits energy of said first wavelength but reflects visible light energy of a second wavelength, a layer of phosphor on the side of said dichroic reflector facing away from said exciting source, said phosphor being capable of excitation by energy of said first wavelength and capable of emitting light of said second wavelength, and a second dichroic reflector positioned against the other surface of said layer of phosphor, said second dichroic reflector reflecting energy of said first wavelength but transmitting light energy of said second wavelength.

5. The apparatus of claim 4 in which said exciting source comprises light within the blue range of the visible spectrum.

6. The apparatus of claim 4 in which said exciting source comprises light within the blue range of the visible spectrum and in which said phosphor emits light within the yellow range.

7. A luminescent screen comprising two dichroic reflectors, the first of which transmits a substantial percentage of energy of a first wavelength and reflects a substantial percentage of energy of a second wavelength, the second dichroic reflector reflecting a substantial percentage of energy of said first wavelength and transmitting a substantial percentage of energy of said second wavelength, and between said dichroic reflectors a layer of a phosphor which emits energy of one of said wavelengths when excited by energy of the other of said wavelengths.

8. A method of increasing effective light output of a phosphor in a desired direction, comprising passing energy of a first wavelength through a dichroic reflector which characteristically transmits energy of said first wavelength but reflects energy of a second wavelength, then passing the energy of said first wavelength into a layer of phosphor which converts said energy into light of said second wavelength, and finally passing said light through another dichroic reflector which characteristically transmits light energy of said second wavelength but reflects energy of said first wavelength.

9. The method of claim 8 in which the energy of said first wavelength is derived from a layer of phosphor which has been excited by a stream of electrons.

FREDERICK H. NICOLL.

REFERENCES CITED

The following references are of record in the file of this patent:

UNITED STATES PATENTS

| Number | Name | Date |
|---|---|---|
| 2,274,901 | Kallmann | Mar. 3, 1942 |
| 2,303,563 | Law | Dec. 1, 1942 |
| 2,344,042 | Kallmann et al. | Mar. 14, 1944 |
| 2,403,685 | Sachtleben et al. | July 9, 1946 |